(12) United States Patent
Matsushita et al.

(10) Patent No.: US 7,513,844 B2
(45) Date of Patent: Apr. 7, 2009

(54) TENSIONER WITH IMPROVED STOPPER

(75) Inventors: Takahiro Matsushita, Osaka (JP); Nobuyuki Fujimoto, Osaka (JP); Kouji Katou, Osaka (JP); Shintarou Yoshimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 306 days.

(21) Appl. No.: 11/196,988

(22) Filed: Aug. 4, 2005

(65) Prior Publication Data

US 2006/0084537 A1 Apr. 20, 2006

(30) Foreign Application Priority Data

Oct. 20, 2004 (JP) ............... 2004-305835

(51) Int. Cl.
*F16H 7/08* (2006.01)
(52) U.S. Cl. .............. 474/111; 474/109; 474/140
(58) Field of Classification Search .......... 474/101–138
See application file for complete search history.

(56) References Cited

U.S. PATENT DOCUMENTS

| 1,326,962 | A | * | 1/1920 | Poindexter ............. 248/67.5 |
| 5,004,449 | A | * | 4/1991 | Ojima ................... 474/138 |
| 5,035,680 | A |   | 7/1991 | Ojima |
| 5,073,158 | A | * | 12/1991 | Ojima ................... 474/138 |
| 5,370,584 | A |   | 12/1994 | Todd |
| 5,676,614 | A |   | 10/1997 | Inoue et al. |
| 6,105,549 | A | * | 8/2000 | Moser ................... 123/198 R |
| 6,435,992 | B2 | * | 8/2002 | Wakabayashi et al. ...... 474/101 |
| 6,447,415 | B1 | * | 9/2002 | Hashimoto et al. .......... 474/110 |

FOREIGN PATENT DOCUMENTS

| GB | 2 356 683   | 5/2001 |
| JP | 4-4548      | 1/1992 |
| JP | 07-042804   | 2/1995 |
| JP | 7-042805    | 2/1995 |
| JP | 9-119489    | 5/1997 |
| JP | 2001-241520 | 9/2001 |

* cited by examiner

*Primary Examiner*—Robert A Siconolfi
*Assistant Examiner*—Thomas W Irvin
(74) *Attorney, Agent, or Firm*—Howson & Howson LLP

(57) ABSTRACT

In a tensioner for a timing chain, a spring-biased plunger for urging a shoe into sliding engagement with the chain is temporarily held in a retracted condition, prior to installation of the tensioner, by a stopper having a pin that extends through a hole in the tensioner housing and engages a grove formed in the plunger. The stopper is bent so that its handle extends away form the pin axis at an angle greater than zero but not greater than 90°. Removal of the stopper from the tensioner can be carried out by rotating the handle to avoid interference with engine components in the vicinity of the tensioner.

8 Claims, 10 Drawing Sheets

TENSIONER WITH IMPROVED STOPPER

FIELD OF THE INVENTION

This invention relates to tensioners of the kind used to maintain tension in a chain of the timing drive of an internal combustion engine, and more particularly to improvements in a stopper for preventing a biased plunger from projecting or disengaging from the tensioner housing before the tensioner is mounted on the engine.

BACKGROUND OF THE INVENTION

In a conventional tensioner for maintaining tension in a flexible, endless, traveling transmission medium, such as the timing chain in an internal combustion engine, a plunger protrudes from a housing and has a shoe at its outer end for sliding contact with the traveling transmission medium. The plunger is urged in the protruding direction by a biasing device, such as a coil spring, inside the tensioner housing. Stoppers have been used to maintain the plunger in a retracted condition, and to prevent the plunger from separating from the tensioner housing during shipping and during installation on an engine. An example of a conventional stopper is depicted in FIG. 6 of Japanese Laid-open Patent Publication No. Hei. 7-42805. Another example of a conventional stopper is described in U.S. Pat. No. 5,676,614, and shown in FIGS. 8 and 9, FIG. 8 being a front elevational view of a tensioner having a conventional stopper, and FIG. 9 being a cross-sectional view taken on plane 9-9 of FIG. 8. In these figures, a tensioner 51 includes a shoe 56, which comes into sliding contact with a chain 55, and a cylindrical plunger 54, which is caused to protrude from a housing 52 by a coil spring 58 in a direction to maintain tension in the chain. The plunger is slidable in a cylindrical bore 53 in the housing, which, together with the plunger 54, defines a hydraulic chamber 57. Oil is supplied under pressure to the chamber 57 from an oil passage (not shown) through a check valve 59.

A guide surface 60, formed On a side of the housing 52, extends in parallel relation to the protruding direction of the plunger 54. An extension 62, facing the guide surface 60, is formed as an integral part of shoe 56, and prevents rotation of plunger 54 about its axis. A pin-receiving hole 63 is formed in the guide surface 60, and a through hole 64 is formed in the extension 62. Hole 64 can be aligned with the pin-receiving hole when the plunger 54 is pushed into the cylindrical bore 53.

By aligning the holes 63 and 64, a pin 61a of a stopper 61 which comprises the pin 61a and a handle 61b, can be inserted through hole 64, and into hole 63, to secure the shoe 56 in fixed relation to the housing 52, and prevent the plunger from being pushed out of the housing by spring 58. After the tensioner is mounted, when the stopper 61 is pulled out, the plunger 54 can protrude and press the shoe 56 against the chain to impart tension to the chain.

Where a tensioner is used in the timing chain system of certain types of automobile engines for example a V-type, double overhead cam (V-DOHC) engine, it may be situated in a very restricted space. In the timing system shown in FIG. 10, for example, a first chain C1 is in mesh with a crankshaft sprocket S1 and two cam sprockets S2 on the camshafts that operate the air intake valves of the engine. Second air-intake cam sprockets S3 are coaxial with, and rotate with, sprockets S2, and chains C2 mesh with sprockets S3 on the air intake camshafts, and sprockets S4 on the exhaust camshafts, so that the exhaust camshafts are driven in synchronism with the air intake camshafts. Tensioner T1, situated along the path of chain C1 between sprocket S1 and one of sprockets S2, controls tension in chain C1 through a pivoting tensioner lever L1. Tensioners T2, each of which is situated between a sprocket S3 and a sprocket S4, control tension in chains C2. Fixed guides G1 and G2 are also provided along the path of chain C1.

When the tensioners T1 and T2 are mounted on an engine, they are typically mounted in spaces that are restricted by the presence of various engine structures and fittings, including fittings associated with the cam sprockets. In particular, the tensioners T2, which apply tension to chain C2, are mounted in very restricted spaces on the insides of the loop-shaped paths of chains C2, where various engine structures are gathered. However, because the stopper 61 in the conventional tensioner 51 is straight, that is, its handle 61b and its pin 61a are aligned along a common axis, the stopper can come into contact with the engine frame or its sprocket fittings, which makes the mounting of the tensioner difficult. Moreover, after the tensioner is installed and the various parts of the timing system are assembled, there is little available space to allow removal of the stopper. Accordingly, in some engine configurations, it is not possible to utilize a tensioner having a stopper of the kind depicted in FIGS. 8 and 9.

SUMMARY OF THE INVENTION

An object of this invention is to overcome the above-mentioned problems of conventional tensioners having plunger stoppers, and to provide a tensioner with a stopper that can be mounted in a very restricted space, and from which the removal of the stopper is not impeded by interference with various engine parts.

The tensioner in accordance with the invention has a housing, and a plunger received in a plunger-receiving hole in the housing. The plunger protrudes outward from the housing, and is biased in its protruding direction. The plunger has a shoe connected to its outer end for sliding contact with an endless, flexible, power transmission medium for maintaining tension therein. A through hole is formed in the housing, and a locking recess, preferably in the form of an annular groove, is formed on the plunger. A stopper is provided, having an elongated pin extending along a pin axis, and a handle connected to the pin and extending along a handle axis. The pin can be extended through the through hole in the housing, for engagement with the locking recess of the plunger, to prevent the plunger from moving in the protruding direction relative to the housing during handling of the tensioner before the shoe is engaged with a power transmission medium. The axes of the pin and the handle intersect, and a part of the axis of the pin that extends beyond the intersection of the pin axis and the handle axis forms an angle with the pin axis on the pin side of the intersection. This angle is greater than zero but not greater than 90 degrees. The bent stopper construction allows the handle to be rotated about the pin axis while the stopper pin is in the through hole of the housing. As a result, the handle of the stopper can be rotated so that contact between the handle and interfering objects in the vicinity of the tensioner can be avoided, and the tensioner can be mounted in a very restricted space. If, after the is mounted tensioner and the various parts of the timing system are assembled, only a very narrow space is available, it is still possible to remove the stopper without difficulty by rotating it to avoid interfering parts. Consequently, assembly of an engine or other mechanism utilizing a tensioner can be greatly facilitated. Optionally, rotation of the stopper during handling and installation of the tensioner can be prevented by configuring the stopper so that its rotation is prevented or restricted until its pin is disengaged from the plunger of the tensioner by a relatively small outward movement of the stopper along its pin axis. Thereafter, the stopper can be easily removed from the tensioner by rotating the handle as necessary to avoid contact with interfering parts.

DETAILED DESCRIPTION OF THE PREFERRED EMBODIMENTS

Figure 1:
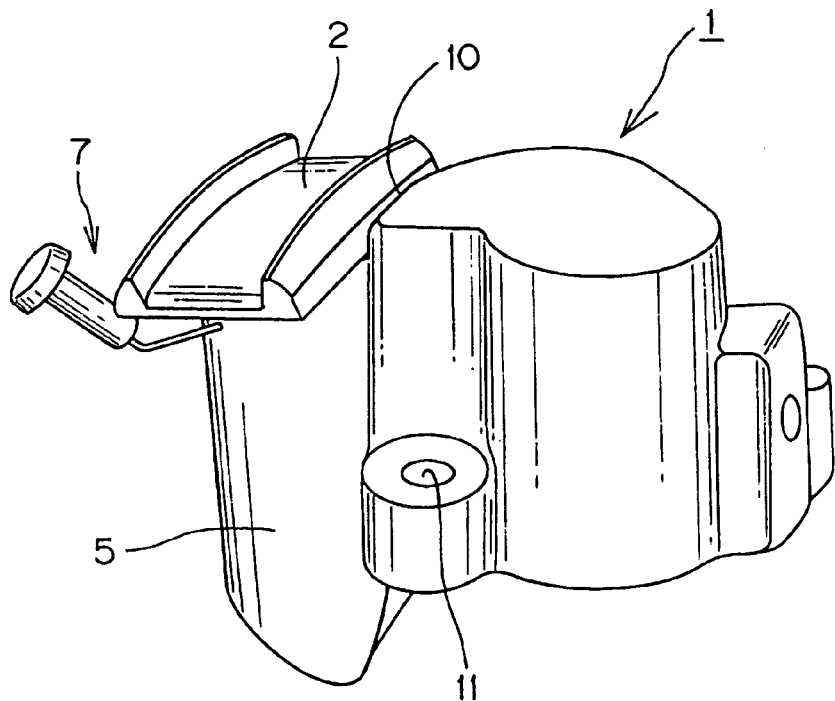
FIG. 1 is a perspective view of a tensioner equipped with a stopper according to a reference example.
Figure 2:
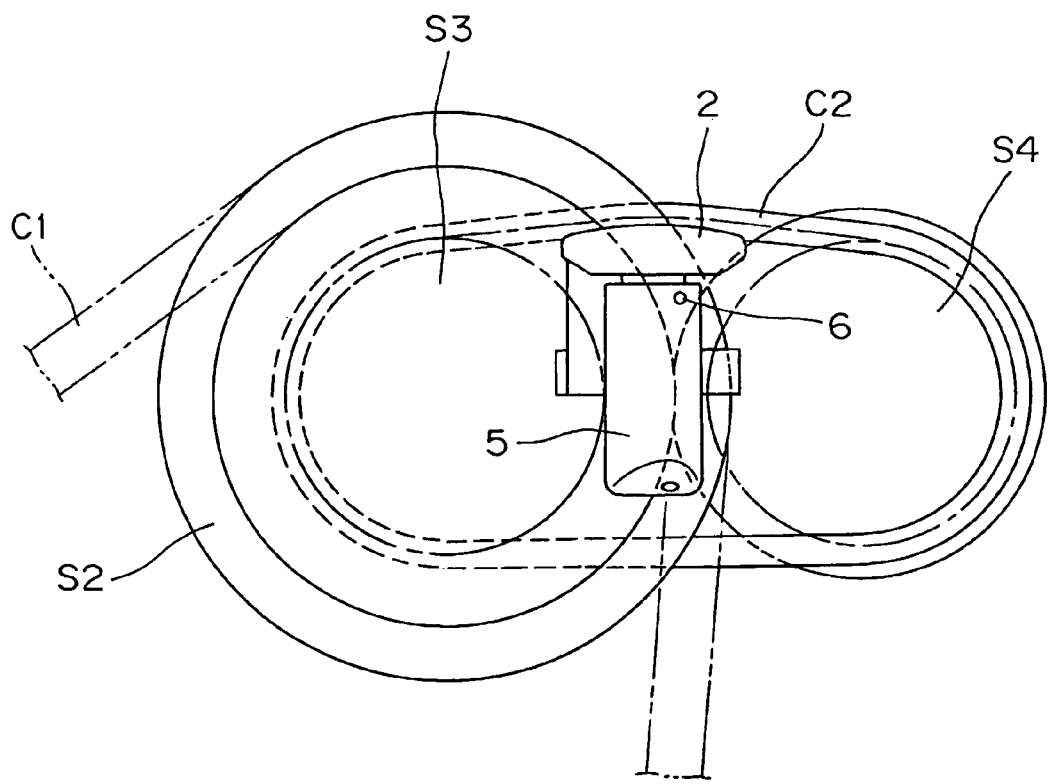
FIG. 2 is a diagrammatic front elevational view illustrating how the tensioner of FIG. 1 maintains tension in a cam-to-cam power transmission chain.
Figure 3:
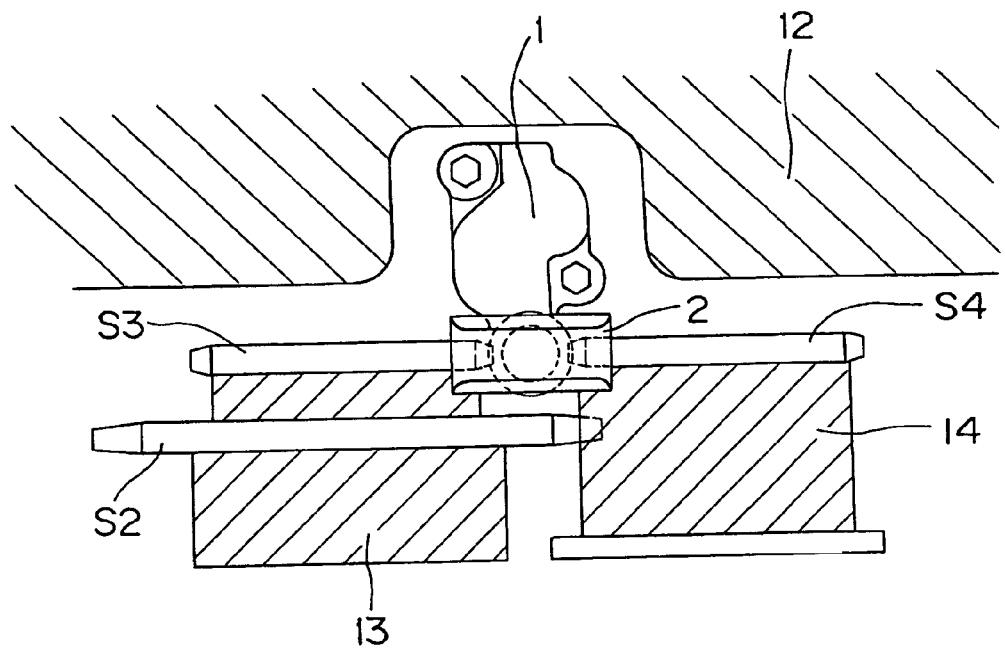
FIG. 3 is a diagrammatic plan view, partly in cross-section, showing how the tensioner of FIGS. 1 and 2 is mounted on an engine block.
Figure 4:
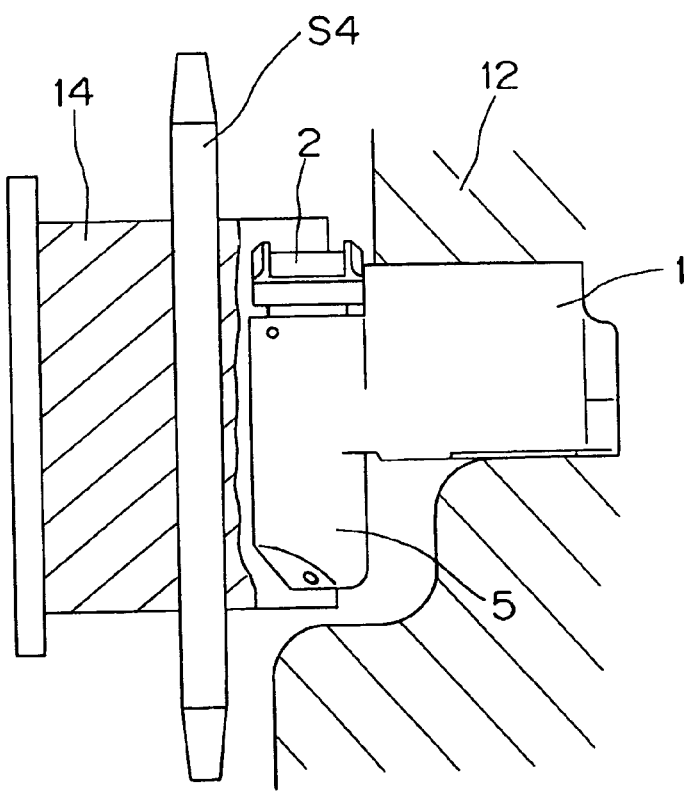
FIG. 4 is a diagrammatic side elevational view, partly in cross-section, showing the tensioner of FIGS. 1-3 mounted on an engine block.
Figure 10:
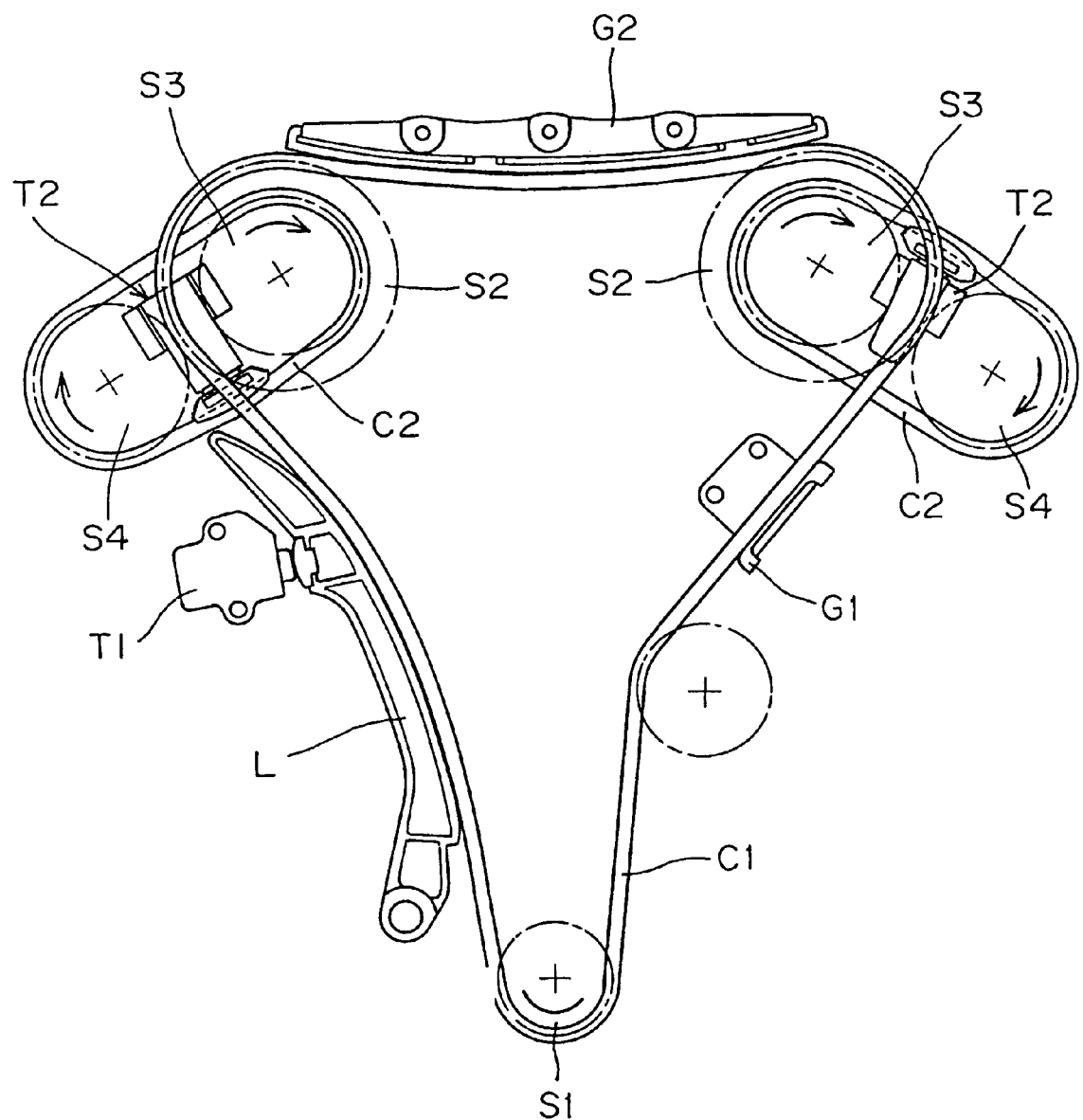
FIG. 10 is a schematic front elevational view showing the timing drive of a dual overhead cam internal combustion engine, having tensioners in which stoppers are used to hold the plungers of the tensioners in place prior to installation of the tensioners.

Tensioner 1, shown in FIG. 1, having a stopper 7 in accordance with the invention, is mounted on an engine block on the inside of the loop-shaped path of a drive chain C2, which, as shown in FIG. 2, is driven by an air-intake cam sprocket S3, and drives an exhaust cam sprocket S4. As shown in FIGS. 3 and 4, the tensioner is mounted in a recess in an engine block 12. The tensioner may be mounted to the engine block by fasteners which extend through mounting holes such as hole 11 in FIG. 1. Sprocket S3 is coaxially fixed, by a fitting 13, to a sprocket S2, which is driven from a crankshaft sprocket S1 (FIG. 10. Sprocket S4 is mounted on a fitting 14.

Figure 5:
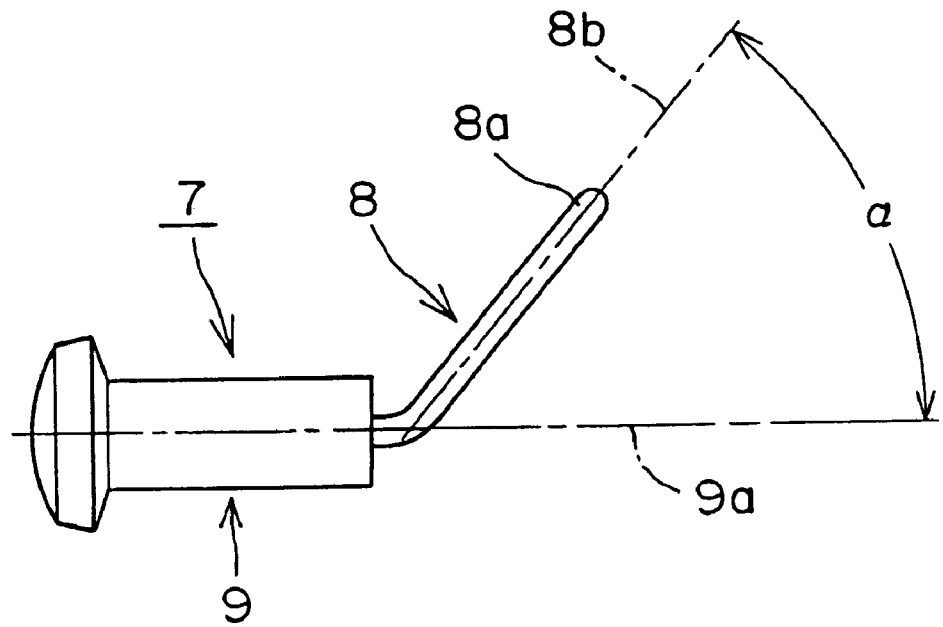
FIG. 5(A) is a side elevational view of a stopper in accordance with the reference example.
FIG. 5(B) is a fragmentary front elevational view, partly in cross-section, showing the stopper of FIG. 5(A) positioned to lock the plunger of a tensioner.
FIG. 5(C) is a side elevational view of a tensioner in which the plunger is locked by the stopper of FIG. 5(A)
Figure 5:
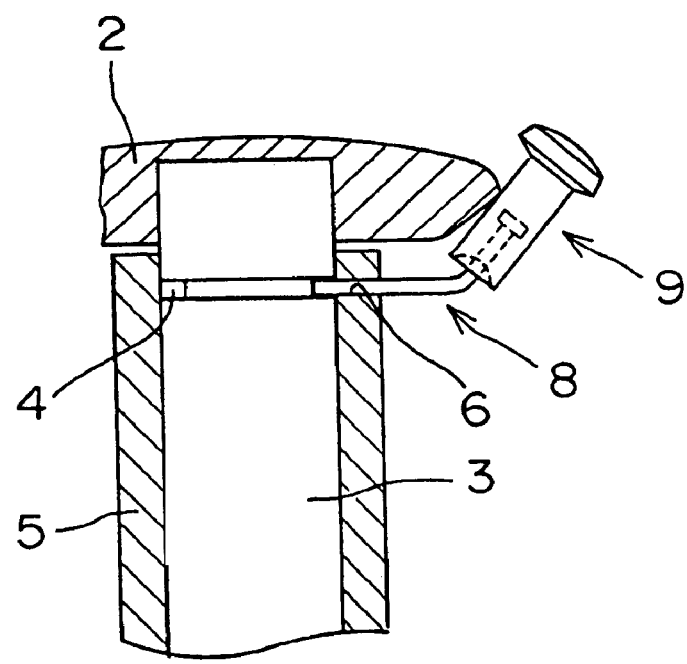
Figure 5:
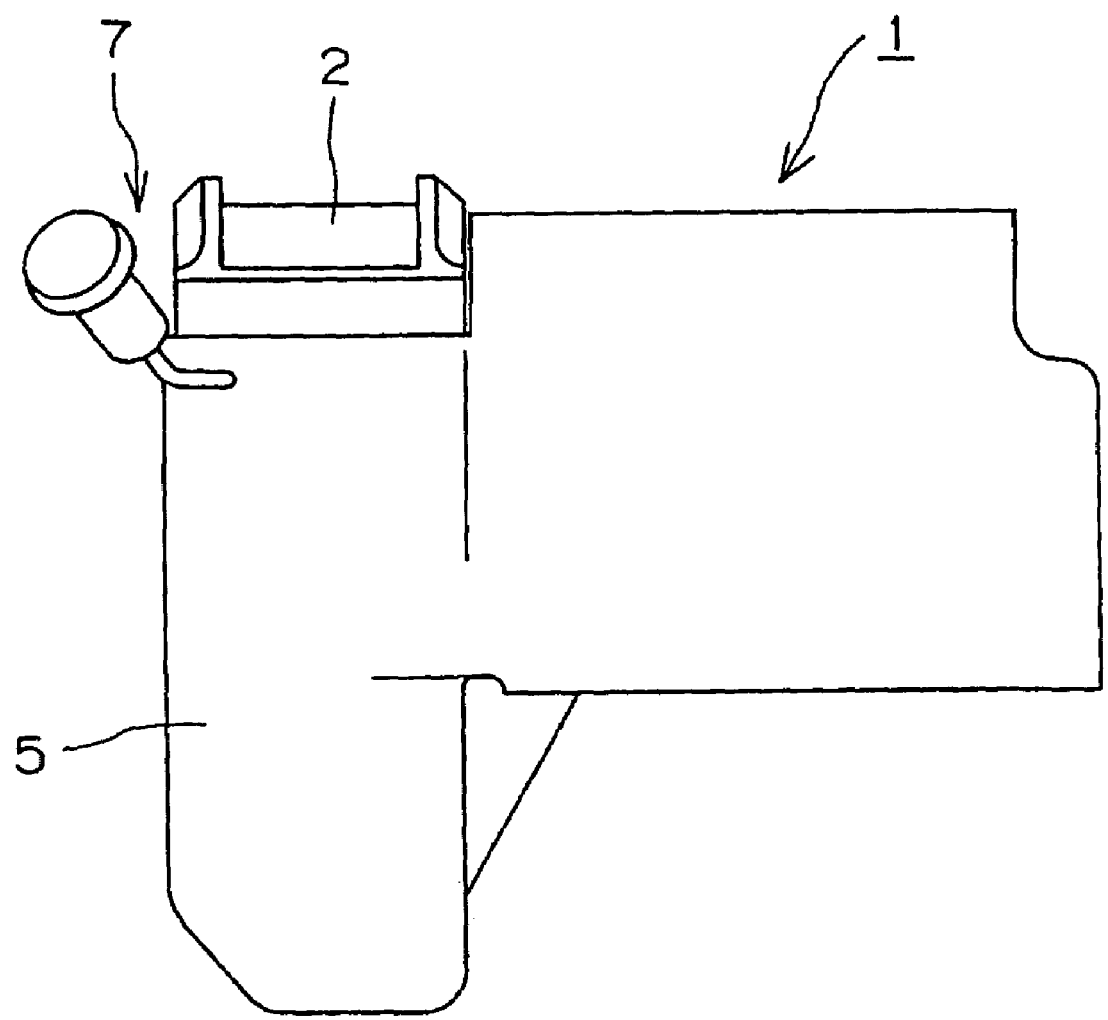

The tensioner 1 has a plunger 3 (FIG. 5(B)), and a shoe 2 is mounted at the outer end of the plunger. This shoe is disposed in sliding contact with chain C2, and is urged outward against the chain by a coiled biasing spring (not shown) within the tensioner housing 5, or by another suitable biasing device. As shown in FIG. 5(B), stopper 7 holds the plunger 3 in the housing, preventing the force exerted by the biasing device from pushing the plunger out of the housing while the plunger is being installed on the engine. After installation of the tensioner, the stopper is removed, and the engagement of the shoe 2 with the chain C2 limits outward movement of the plunger. As seen in FIG. 1, a shoulder 10 is formed on the tensioner housing. When the plunger 3 is pushed into the housing, the shoe 2 is brought into contact with shoulder 10 so that the rotation of the shoe 2 and the plunger 3 is prevented.

As shown in FIG. 5(B), an annular locking groove 4 is provided on the outer circumferential surface of plunger 3 at a location such that the groove is positioned inside the housing when the plunger is pressed into the housing. A through hole 6 is drilled in the housing 5 for receiving the pin 8 of the stopper so that the pin can extend through hole 6 and enter groove 4 to hold the plunger in the retracted condition depicted in FIG. 5(B). Although the locking groove 4 is preferably in the form of an annular groove on the outer circumference of the plunger 3, the pin it may also be in the form of a recess, formed only on a part of the outer circumference of the plunger 3.

As seen in FIG. 5(A), the stopper has a handle 9, which extends along an axis 9a. As in the example shown in FIG. 5(A), the handle can be symmetrical, in which case the handle axis can be an axis of symmetry of the handle. The handle may also be elongated, in which case, the handle axis will ordinarily extend along the direction of elongation of the handle. However, the handle does not need to be symmetrical or elongated. In any case, the handle axis 9a defines the direction in which the handle extends away from the pin. The stopper is bent so that the handle axis is disposed at an angle a with respect to the axis 8b of the pin 8. More specifically, the axes 8b of the pin, and 9a of the handle, intersect, and the portion of axis 9a, which extends from the handle beyond the intersection, forms an angle α with respect to the axis 8b of the pin 8 on the pin side of the intersection, that is, the side of the intersection on which the pin is located. The angle α must be greater than zero, but not greater than 90°. If the angle α is more than 90°, rotation of the stopper 7 while the front end 8a of the pin is inserted into the pin through hole 6 becomes impossible because the handle 9, which rotates with the pin 8, would come into contact with the tensioner housing 5, making it difficult to remove the stopper 7 from the tensioner housing 5.

In the assembly of the tensioner, the plunger 3 is pushed into the housing 5 against the biasing device, and the annular locking groove 4, formed on the outer circumferential surface of the plunger 3, is aligned with the pin through hole 6 in the housing 5, so that the front end pin 8a of the stopper pin 8 may be inserted through hole 6 and into engagement with the groove 4. The pin holds the plunger 3 in the housing 5. After the tensioner is mounted, and the drive chain with which the tensioner is to be associated is installed on its sprockets, the stopper 7 may be pulled out, allowing the plunger 3 to protrude under the force exerted by the biasing device, until the shoe 2 is brought into contact with, and applies tension to, the chain C2.

The handle 9 of the stopper 7 is pivotable so that contact between the handle and interfering objects such as engine fittings and the like in the vicinity of the tensioner can be avoided. Consequently, the tensioner 1, with the stopper 7 installed, can be mounted in a very restricted space. Furthermore, even if only a limited space is available after mounting the tensioner with the stopper installed in it, the handle 9 can be pivoted about the axis 8b of pin 8 so that interfering objects can be avoided, and the stopper 7 can be removed. Accordingly, assembly of the engine, or other mechanism in which the tensioner is used, can be greatly facilitated.

Figure 6:
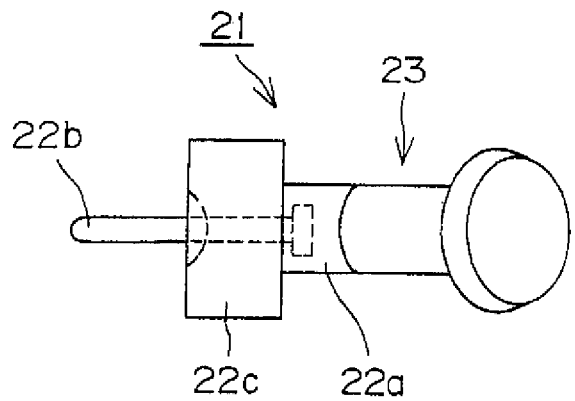
FIG. 6(A) is a top plan view of a stopper in accordance with an embodiment of the invention.
FIG. 6(B) is a side elevational view of the stopper of FIG. 6(A)
FIG. 6(C) is an elevational view of the stopper of FIGS. 6(A) and 6(B), as seen from the left-hand side of FIG. 6(B)
FIG. 6(D) is a fragmentary front elevational view, partly in cross-section, showing the stopper of FIGS. 6(A)-6(C) positioned to lock the plunger of a tensioner.
Figure 6:
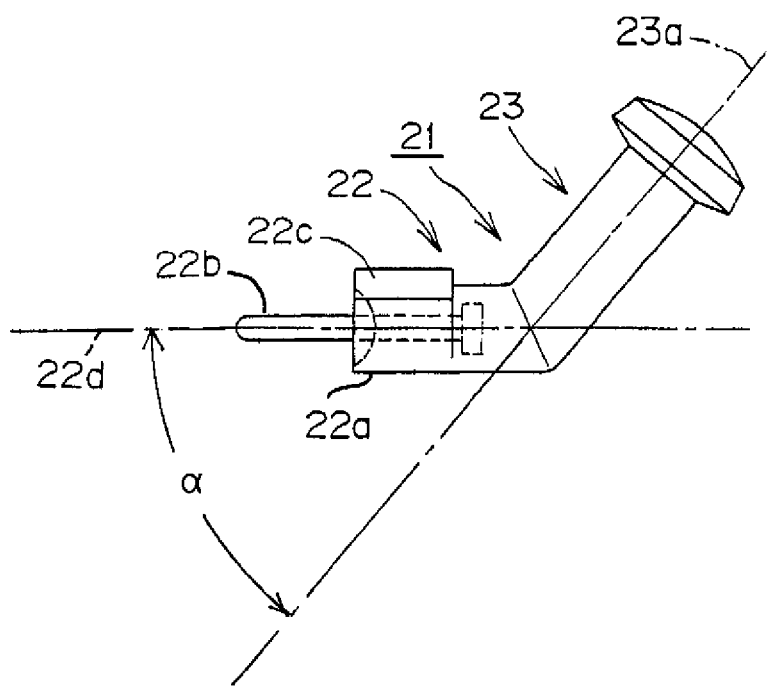
Figure 6:
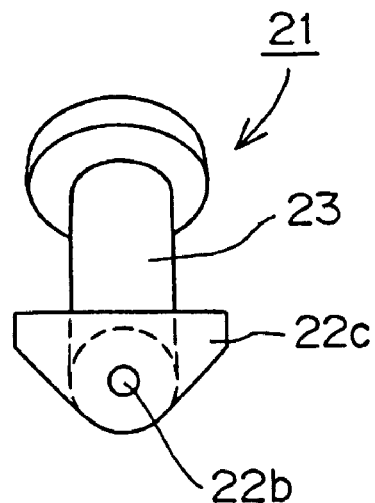
Figure 6:
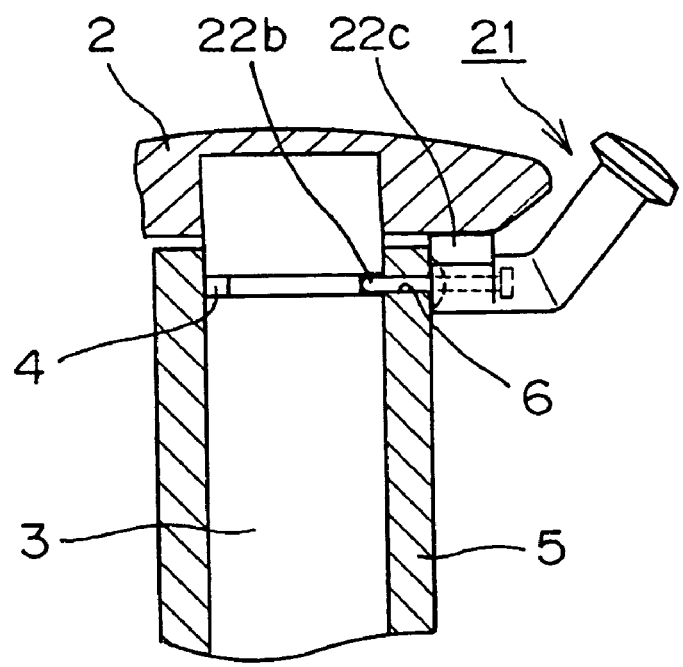
Figure 7:
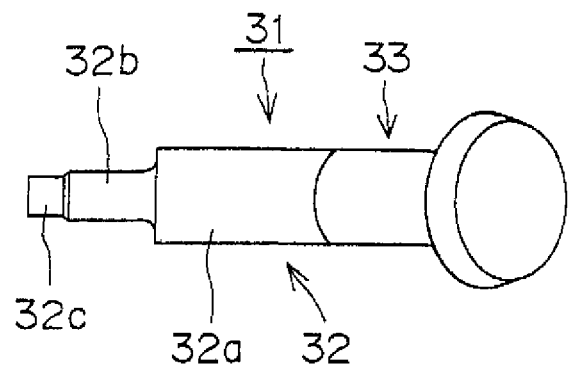
FIG. 7(A) is a top plan view of a stopper in accordance with another embodiment of the invention.
FIG. 7(B) is a side elevational view of the stopper of FIG. 7(A)
FIG. 7(C) is an elevational view of the stopper of FIGS. 7(A) and 7(B), as seen from the left-hand side of FIG. 7(B)
FIG. 7(D) is a fragmentary front elevational view, partly in cross-section, showing the stopper of FIGS. 7(A)-7(C) positioned to lock the plunger of a tensioner.
Figure 7:
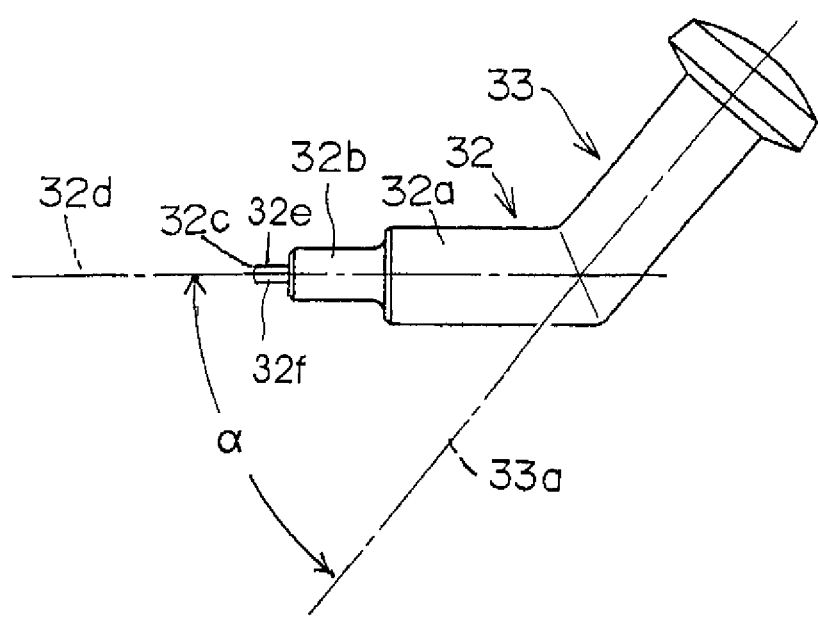
Figure 7:
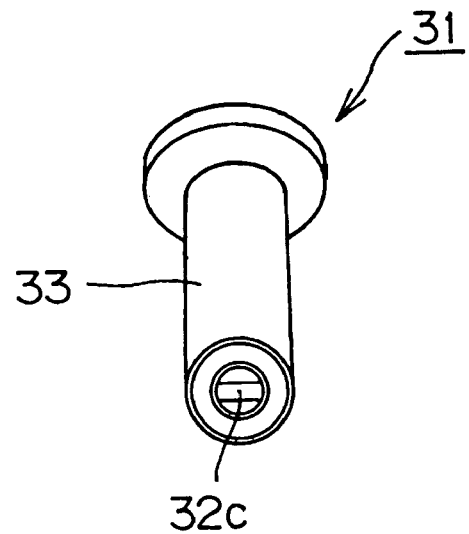
Figure 7:
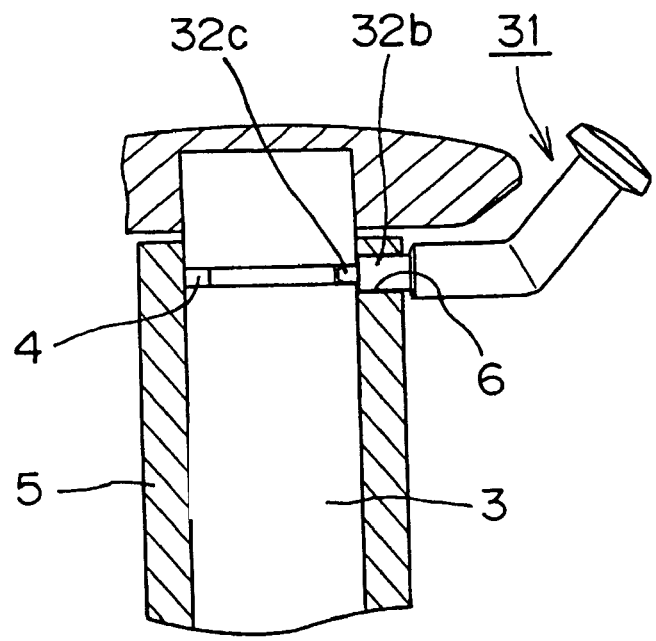
Figure 8:
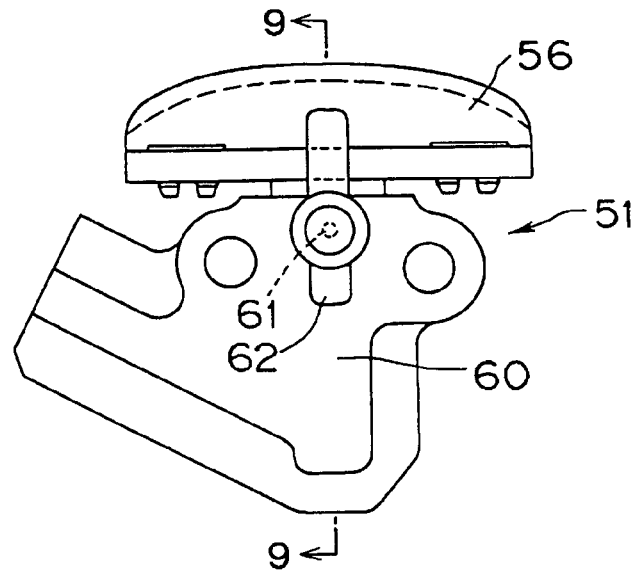
FIG. 8 is a front elevational view of a tensioner having a conventional stopper.
Figure 9:
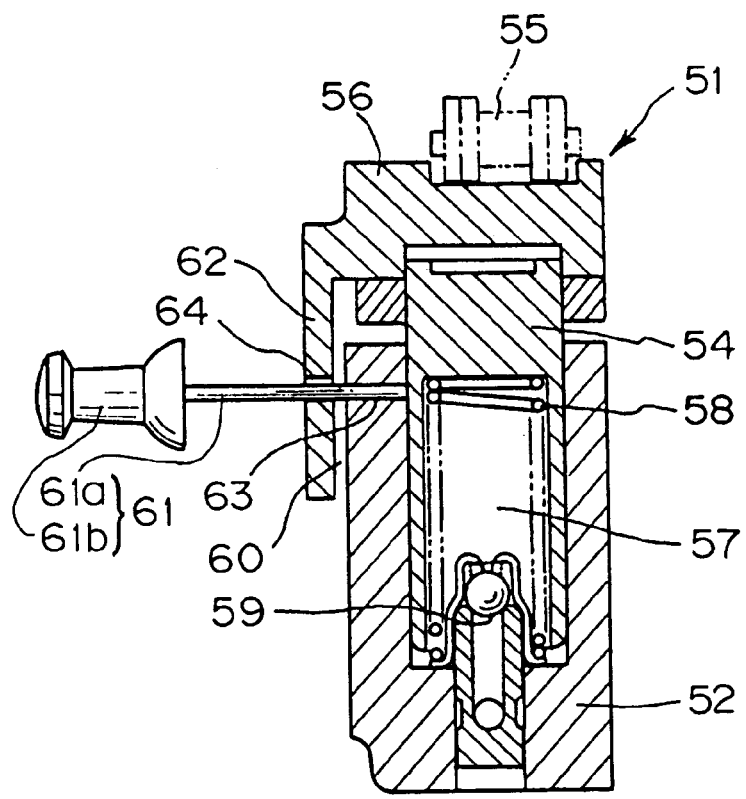
FIG. 9 is a cross-sectional view taken on plane 9-9 of FIG. 8.

In the second embodiment, shown in FIGS. 6(A)-6(D), the stopper has a different construction. The stopper 21 is composed of a pin body portion 22 and a handle 23. The pin body portion 22 is includes a pin holder 22a and a pin 22b. The pin holder 22a includes a top 22c, which abuts a shoe 2 when the stopper 21 is attached to the tensioner, as shown in FIG. 6(D). The handle 23 is bent at an angle α with respect to the pin body portion 22. As in the case of the first embodiment, described above, the angle α is greater than zero, but not more than 90°.

During assembly of the tensioner of FIGS. 6(A)-6(D), the plunger 3 is pushed into the housing 5 against a biasing member until the annular locking groove 4 is aligned with the through hole 6 in the housing 5. Pin 22b, at the front end of the pin body 22, is inserted through hole 6 and into groove 4, preventing the plunger from being pushed out of the housing until the tensioner is installed.

Since the top 22c of the pin holder engages the shoe to prevent, or at least limit, rotation of the stopper, the handle remains substantially in the position depicted in FIG. 6(D) during installation of the tensioner. However, when the stopper is pulled a short distance so that the front end of the pin 22b disengages the locking groove 4 of the plunger, the plunger can move outward until the shoe applies tension to its associated chain. When the plunger moves forward, the shoe no longer restricts rotation of the stopper, and the stopper can be rotated, if necessary, to allow it to be fully removed from the tensioner In the third embodiment, depicted in FIGs. 7(A)- 7(D), the stopper 31 is composed of a pin body 32 and a handle 33, and the pin body 32 is composed of a pin holder 32a, a fitting 32b, and a solid rectangular pin 32c. When the stopper 31 is attached to the tensioner, the fitting 32b fits into a through hole 6 in the housing 5, and the rectangular pin 32c engages the locking groove 4 of the plunger 3. As in the previously described embodiments, the axis 33a of handle 33 intersects axis 32d of the pin body, and is disposed at an angle α with respect to the axis 32d of the pin body 32 on the pin side of the intersection, the angle α being greater than zero, but not greater than 90°.

Because the pin 32c is rectangular in shape, when it is engaged in the locking groove 4, pivoting of the stopper is either limited or prevented altogether by the engagement of the pin's rotation-limiting surfaces 32e and 32f with the walls of the locking groove 4 in the plunger. The pin holds the plunger in its retracted condition prior to installation of the tensioner. After installation, the stopper can be pulled a short distance to disengage pin 32c from groove 4. Thereupon, the plunger is urged outward by the biasing device of the tensioner, and into engagement with its associated chain. At the same time, when the pin disengages the locking groove, pivoting movement of the of the stopper is no longer prevented, and the stopper handle can be moved as required to clear any interfering parts so that the stopper can be fully removed from the tensioner.

We claim:

1. A tensioner having a housing, and a plunger received in a plunger-receiving hole in the housing, the plunger protruding outward from the housing, biased in its protruding direction, and having an outer end, and a shoe connected to the outer end of the plunger, the shoe having a front surface for sliding contact with an endless, flexible, power transmission medium for maintaining tension therein and a back surface, a through hole formed in the housing, a locking recess formed on the plunger, and a stopper, the stopper comprising an elongated pin at least a part of which extends along a substantially straight pin axis, and a manually graspable handle connected to the pin and extending along a straight handle axis, the handle having thickness, measured transverse to the handle axis, greater than the thickness of the pin, and said part of the pin being extendible, from outside the housing, through the through hole in the housing, and engageable, inside the housing, with said locking recess of the plunger for preventing the plunger from moving in the protruding direction relative to the housing during handling of the tensioner before the shoe is engaged with a power transmission medium, wherein the axes of the pin and the handle intersect at a location that is outside said housing when the pin extends through said through hole and is engaged with said locking recess, and a part of the handle axis that extends beyond the intersection of the pin axis and the handle axis forms an angle with the pin axis, said angle being greater than zero and not greater than 90 degrees, wherein the stopper includes a pin holder surrounding a part of the pin extending along said pin axis, the pin holder having a rotation-limiting surface opposed to and engageable with the back surface of the shoe when the pin is engaged with the locking recess of the plunger, and wherein engagement of said rotation-limiting surface with the shoe limits rotation of the stopper about said substantially straight pin axis, thereby preventing rotation of the stopper beyond a limited range while the plunger is locked in a retracted condition by the stopper, but allowing the stopper to be rotated beyond said limited range when the pin is disengaged from the locking recess.

2. A tensioner according to claim 1, in which the stopper comprises a pin holder portion connected to the pin and the handle, in which the rotation limiting surface is a surface of said pin holder portion, said rotation-limiting surface abutting the shoe when the pin is engaged with the locking recess, and in which said angle formed by the handle axis with the pin axis on the pin side of said intersection is an acute angle.

3. A tensioner according to claim 2, in which, when said rotation-limiting surface is engaged with said shoe, said stopper is fixed against rotation about said substantially straight pin axis.

4. A tensioner according to claim 1, in which, when said rotation-limiting surface is engaged with said shoe, said stopper is fixed against rotation about said substantially straight pin axis.

5. A tensioner having a housing, and a plunger received in a plunger-receiving hole in the housing, the plunger protruding outward from the housing, biased in its protruding direction, and having an outer end, and a shoe connected to the outer end of the plunger for sliding contact with an endless, flexible, power transmission medium for maintaining tension therein, a through hole formed in the housing, a locking recess formed on the plunger, and a stopper, the stopper comprising an elongated pin at least a part of which extends along a substantially straight pin axis, and a manually graspable handle connected to the pin and extending along a straight handle axis, the handle having a thickness, measured transverse to the handle axis, greater than the thickness of the pin, and said part of the pin being extendible, from outside the housing, through the through hole in the housing, and engageable, inside the housing, with said locking recess of the plunger for preventing the plunger from moving in the protruding direction relative to the housing during handling of the tensioner before the shoe is engaged with a power transmission medium, wherein the axes of the pin and the handle intersect at a location that is outside said housing when the pin extends through said through hole and is engaged with said locking recess, and a part of the handle axis that extends beyond the intersection of the pin axis and the handle axis forms an angle with the pin axis, said angle being greater than zero and not greater than 90 degrees, and wherein the pin includes a rotation-limiting surface engageable with a wall of the locking recess of the plunger, and wherein engagement of said rotation-limiting surface with said wall of the locking recess limits rotation of the stopper about said substantially straight pin axis, thereby preventing rotation of the stopper beyond a limited range while the plunger is locked in a retracted condition by the stopper, but allowing the stopper to be rotated beyond said limited range when the pin is disengaged from the locking recess, and in which said stopper includes a cylindrical part, having a diameter greater than the thickness of the pin, that fits into the through hole in the housing when the pin is engaged with the locking recess of the plunger, said cylindrical part fitting rotatably in said through hole and allowing said stopper to rotate beyond said limited range, while limiting rotation of the stopper to rotation about said substantially straight pin axis, when the stopper is withdrawn sufficiently to disengage the pin from the locking recess.

6. A tensioner according to claim 5, in which the stopper comprises a fitting connected to the pin and the handle, said fitting being insertable into said through hole in the housing, said pin extending from the fitting and being capable of entering the locking recess of the plunger when said fitting is inserted into said through hole in the housing, in which said pin has a rectangular cross-section, and in which the rotation limiting surface of the pin is a flat surface of said pin, said flat surface engaging a wall of the locking recess when the pin is engaged with the locking recess and thereby limiting rotation of the stopper, and in which said angle formed by the handle axis with the pin axis on the pin side of said intersection is an acute angle.

7. A tensioner according to claim 6, in which, when said flat surface of the pin is engaged with said wall of the locking recess, said stopper is fixed against rotation about said substantially straight pin axis.

8. A tensioner according to claim 5, in which, when said rotation-limiting surface is engaged with said wall of the locking recess, said stopper is fixed against rotation about said substantially straight pin axis.

* * * * *

UNITED STATES PATENT AND TRADEMARK OFFICE
CERTIFICATE OF CORRECTION

PATENT NO. : 7,513,844 B2  Page 1 of 1
APPLICATION NO. : 11/196988
DATED : April 7, 2009
INVENTOR(S) : Takahiro Matsushita et al.

It is certified that error appears in the above-identified patent and that said Letters Patent is hereby corrected as shown below:

Title Pg. Item (57) Abstract, line 5, "grove" should read --groove--;

Under Abstract, line 7, "form" should read --from--;

Column 4, lines 39 and 40, "angle a" should read --angle α--;

Signed and Sealed this

Second Day of June, 2009

JOHN DOLL
*Acting Director of the United States Patent and Trademark Office*